(12) United States Patent
Myrick et al.

(10) Patent No.: US 11,959,586 B2
(45) Date of Patent: Apr. 16, 2024

(54) ATTACHABLE FOOT ASSEMBLY

(71) Applicants: Maxwell Myrick, Camarillo, CA (US); Vincent Castagna, Chatsworth, CA (US)

(72) Inventors: Maxwell Myrick, Camarillo, CA (US); Vincent Castagna, Chatsworth, CA (US)

(73) Assignee: PRODUCTION GOD LLC, Camarillo, CA (US)

( * ) Notice: Subject to any disclaimer, the term of this patent is extended or adjusted under 35 U.S.C. 154(b) by 116 days.

(21) Appl. No.: 17/689,679

(22) Filed: Mar. 8, 2022

(65) Prior Publication Data

US 2023/0288015 A1 Sep. 14, 2023

(51) Int. Cl.
*F16M 11/24* (2006.01)
*F41A 23/06* (2006.01)
*F41A 23/12* (2006.01)
*F41A 23/14* (2006.01)

(52) U.S. Cl.
CPC .......... *F16M 11/24* (2013.01); *F16B 2200/10* (2018.08); *F16M 2200/08* (2013.01); *F41A 23/06* (2013.01); *F41A 23/12* (2013.01); *F41A 23/14* (2013.01)

(58) Field of Classification Search
CPC ..... F16M 11/24; F16M 2200/08; F41A 23/06; F41A 23/12; F41A 23/14; F16B 2200/10
See application file for complete search history.

(56) References Cited

U.S. PATENT DOCUMENTS

| | | | | |
|---|---|---|---|---|
| 5,194,678 A | * | 3/1993 | Kramer | F16M 11/242 89/37.04 |
| 7,591,446 B2 | * | 9/2009 | Istas | F16M 11/14 403/77 |
| 2004/0045493 A1 | * | 3/2004 | Schmidt | F16C 11/069 114/361 |
| 2009/0126250 A1 | * | 5/2009 | Keng | F41A 23/10 42/94 |
| 2010/0224745 A1 | * | 9/2010 | Orlov | F16M 11/18 248/188.2 |
| 2020/0116295 A1 | * | 4/2020 | Dunn | F16B 21/078 |
| 2020/0300573 A1 | * | 9/2020 | Barnett | F41A 23/08 |

* cited by examiner

*Primary Examiner* — Tan Le
(74) *Attorney, Agent, or Firm* — Cohen IP Law Group, PC; Michael N. Cohen

(57) ABSTRACT

An attachable foot assembly designed to be attached to a lower portion of a camera tripod stand leg is provided. The bottom surface of the foot attachment is interchangeable and is chosen depending on the environment in which the tripod is to be used. For example, if the tripod is to be used for lateral movement upon a smooth ground surface (e.g., carpeted floors, hardwood floors, tiled surfaces, natural grass, AstroTurf, etc.), the bottom surface of the foot attachments may be chosen to be wide, convex, and smooth to enable the tripod to smoothly slide laterally upon the surface. In addition, the attachable foot assembly includes a rotatable mount enabling the attachment to fit upon tripod legs at various angles and to move over uneven surfaces.

20 Claims, 7 Drawing Sheets

ATTACHABLE FOOT ASSEMBLY

FIELD OF THE INVENTION

This invention relates to stands, including an attachable foot assembly for stands.

BACKGROUND

Tripods are used to mount video cameras and to hold the cameras stable during shooting. However, the feet of most tripod stands are designed to include a small footprint and to grip the ground surface. Accordingly, it is difficult to slide most tripods over smooth surfaces such as carpeted or hardwood floors without the tripod catching and jumping.

Accordingly, there is a need for an attachable foot assembly for tripod stands that provides a wider and smoother footprint for the tripods' feet.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the attachable foot assembly according to exemplary embodiments hereof includes an assembly designed to be attached to a lower portion of a stand. In some embodiments, the assembly is coupled with the lower portions of a camera tripod. For example, the assembly may be coupled to the bottom ends of each tripod leg, thereby providing a foot attachment to each leg. The bottom surface of the foot attachment is interchangeable and may be chosen depending on the environment in which the tripod is to be used. For example, if the tripod is to be used for lateral movement upon a smooth ground surface (e.g., carpeted floors, hardwood floors, tiled surfaces, natural grass, Astro-Turf, etc.), the bottom surface of the foot attachments may be chosen to be wide, convex, and smooth to enable the tripod to smoothly slide laterally upon the surface. Conversely, if the tripod is to be used for stationary shots upon a slippery surface, the bottom surface of the foot attachments may include a textured, treaded, or even cleated surface to hold the tripod stationary. It also is contemplated that the foot attachment may include wheels (e.g., off road wheels), shock absorbers/stabilizers, other types of accessories, and any combinations thereof. In addition, the attachable foot assembly may include a rotatable mount enabling the attachment to fit upon tripod legs at various angles and to move over uneven surfaces.

The attachable foot assembly will be described in detail with reference to FIGS. 1-8.

Figure 1:
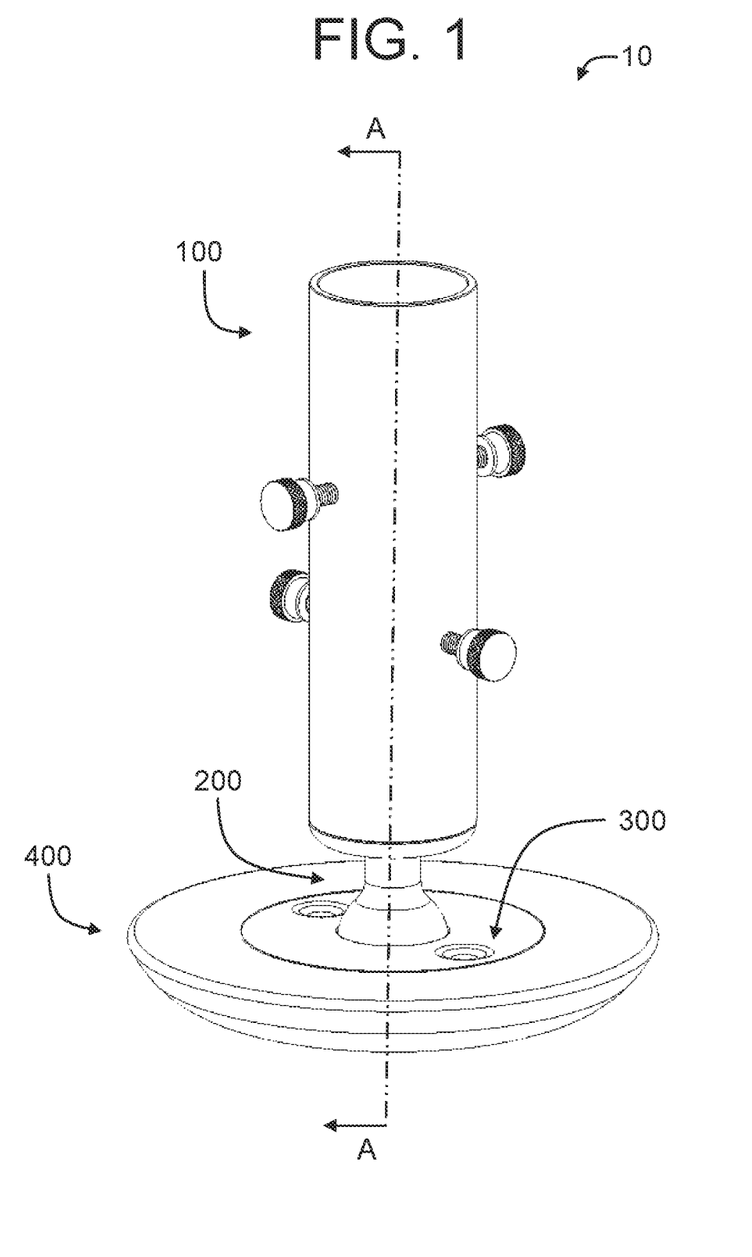
FIG. 1 shows a schematic of an attachable foot assembly according to exemplary embodiments hereof.

In one exemplary embodiment hereof, as shown in FIG. 1, the attachable foot assembly 10 (also referred to herein as simply the assembly 10) includes an attachment housing 100, a rotational mount 200, a rotational member 300, and a foot attachment 400. In general, the attachment housing 100 facilitates the attachment of a camera stand leg (e.g., the lower end portion of a tripod leg) to the attachable foot assembly 10. The rotational mount 200 is coupled to the distal end of the attachment housing 100. The rotational member 300 is attached to the rotational mount 200. The foot attachment 400 is then removably coupled to the rotational member 300. The attachable foot assembly 10 also may include other elements as necessary for it to fulfill its functionalities.

Figure 2:
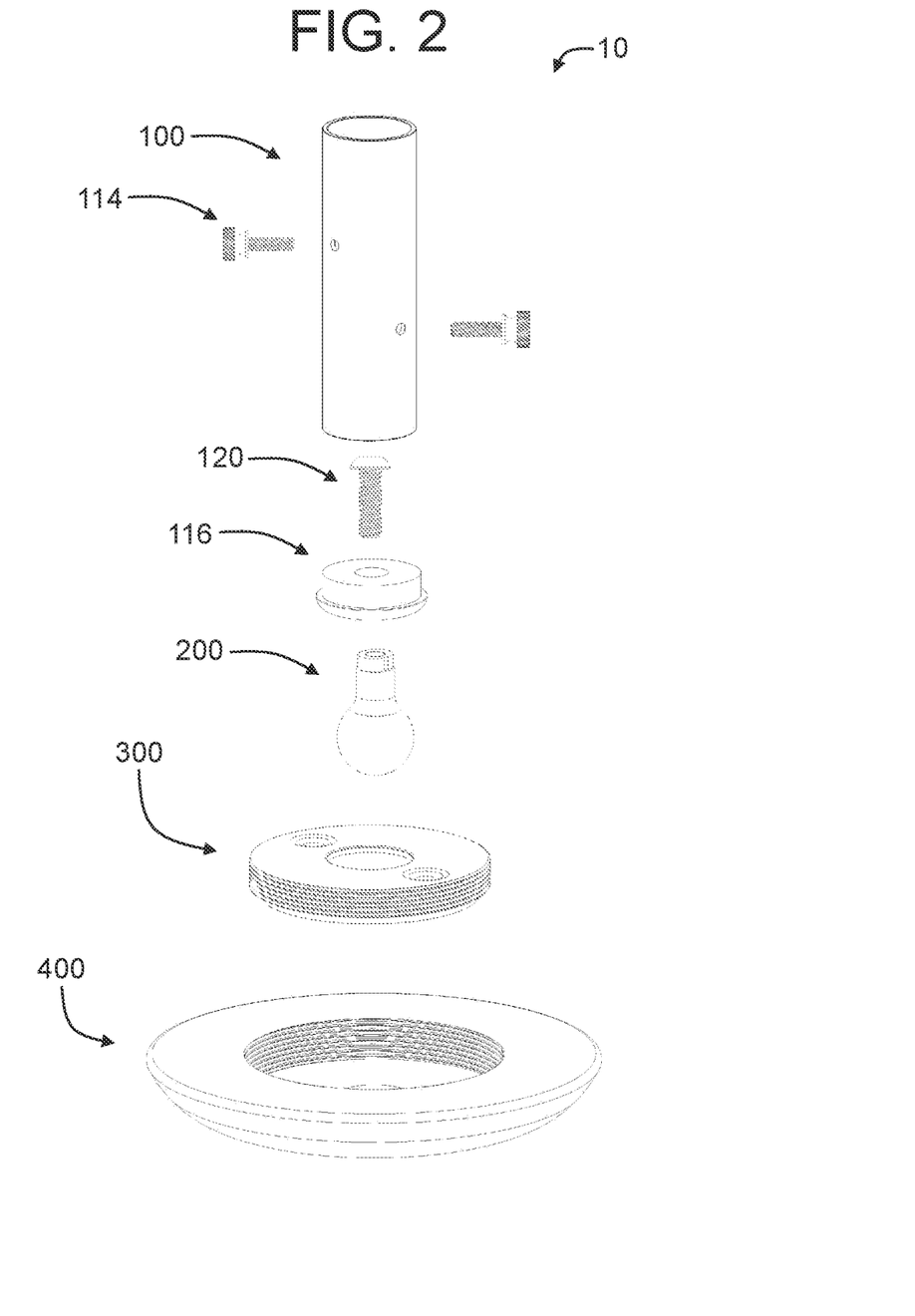
FIG. 2 shows an exploded view of the attachable foot assembly of FIG. 1 according to exemplary embodiments hereof.

FIG. 2 shows an exploded view of the assembly 10 of FIG. 1.

Figure 3:
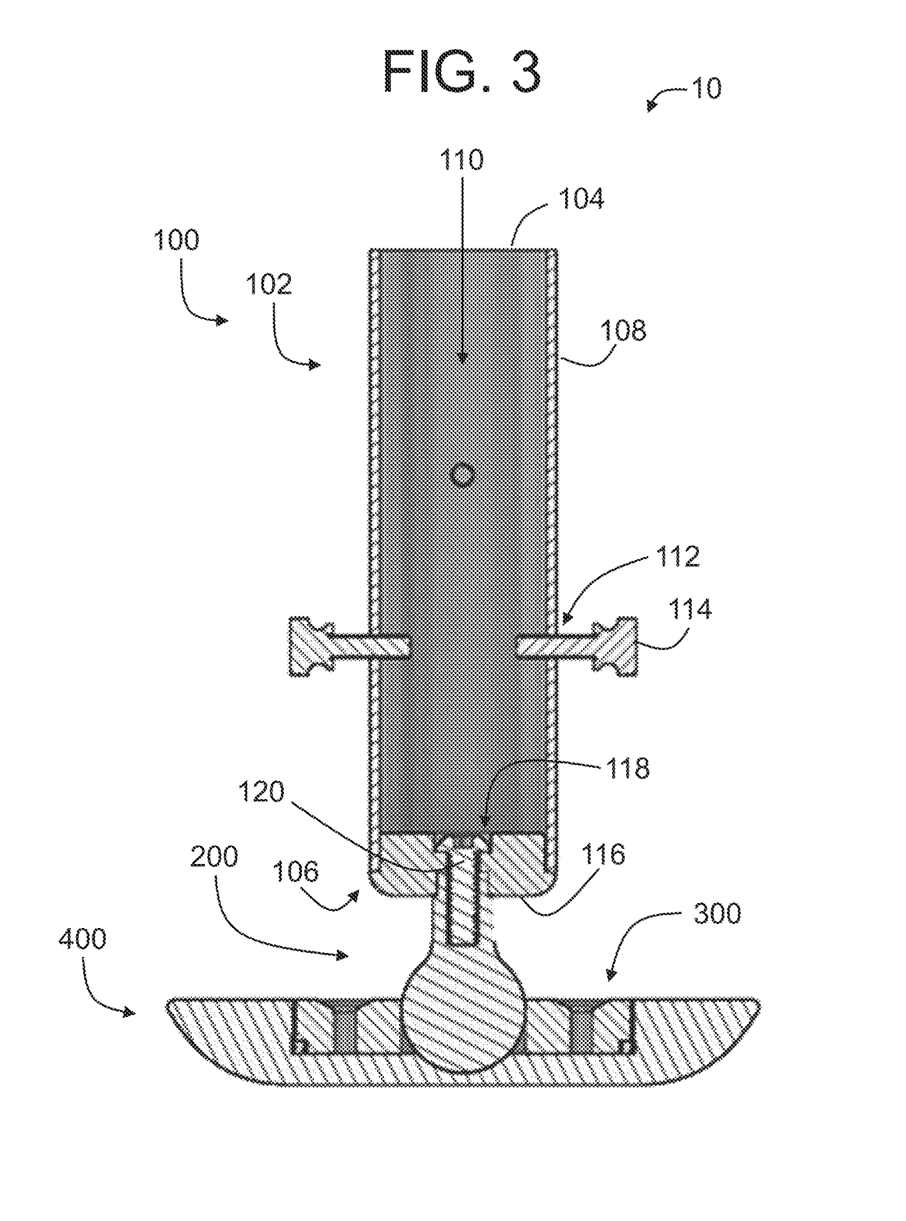
FIG. 3 shows a sectional view of the attachable foot assembly of FIG. 1 according to exemplary embodiments hereof.

FIG. 3 shows a sectional view of the assembly 10 taken from the perspective of cut-lines A-A of FIG. 1.

In some embodiments, as shown in FIG. 3, the attachment housing 100 includes an elongate member 102 including a first end 104 (e.g., a proximal end), a second end 106 (e.g., a distal end), and sidewalls 108 extending between the first end 104 and the second end 106 defining an inner volume 110.

In some embodiments, the elongate member 102 includes a cylindrical form (e.g., a generally hollow tube) with a circular cross-sectional shape. However, it is understood that the elongate member 102 may include any type and/or form of elongate body with any shaped cross-section as suitable to fulfill its functionalities. In some embodiments, the diameter of the elongate member 102 (e.g., the diameter of the open first end 104) is about 0.5"-2", and preferably about 0.75"-1.5", and more preferably about 1.3". However, it is understood that the elongate member 102 may include any dimensions as necessary to accommodate any stand leg of any dimensions and to adequately fulfill its functionalizes.

In some embodiments, the attachment housing 100 is adapted to receive an end portion (e.g., a bottom end) of a camera stand (e.g., a camera tripod) through its first end 104 and releasably secure it within its inner volume 110. Accordingly, the first end 104 may preferably be generally open.

In some embodiments, the elongate member 102 includes one or more openings 112 (preferably threaded) that extend through the sidewall 108 from outside the elongate member 102 to its inner volume 110. The openings 112 may be adapted to receive (preferably threadedly), one or more thumb screws 114 that may be screwed into the openings 112 from the outside of the sidewalls 108 so that at least a portion of the thumbscrews 114 extend into the housing's inner volume 110. It may be preferable that the thumbscrews 114 are oriented at a perpendicular angle with respect to the sidewalls 108 but this may not be necessary. In this way, the thumbscrews 114 may be screwed into the inner volume 110 to engage an end portion of a tripod leg within the inner volume 110 and thereby secure it therein, and subsequently unscrewed to release the tripod leg for removal of the leg from the housing 100.

In some embodiments, as shown in FIGS. 2 and 3, the attachment housing 100 includes an end cap 116 adapted to generally cap the elongate member's second end 106. The end cap 116 may be inserted into the second end 106 of the elongate member 102 and held therein. In some embodiments, the end cap 116 may be held within the second end 106 by welding, pressure fit, detents, ribs, other attachment methods, and any combinations thereof.

The end cap 116 includes a through hole 118 adapted to receive a screw 120 so that a portion of the screw 120 may extend from within the elongate member's inner volume 110 through the second end 106 to outside the inner volume 110. In some embodiments, it may be preferable that the through hole 118 be countersunk to receive the head of the screw 120 within the inner volume 110, but this may not be required. As will be described in other sections, the portion of the screw 120 extending outside the end cap 116 may be attached to the rotational mount 200 and secure it thereto.

Figure 4:
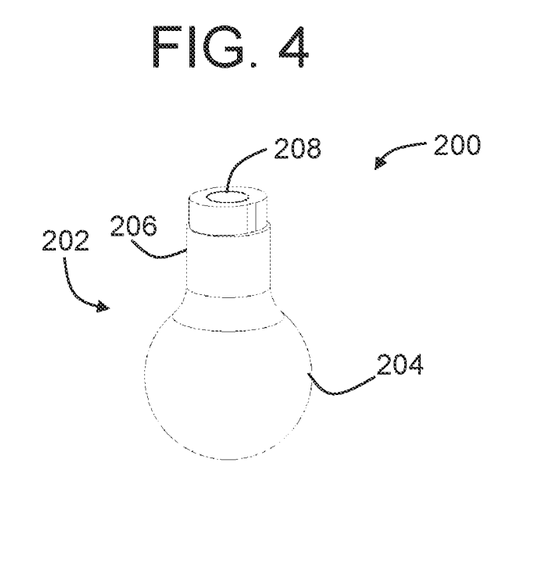
FIG. 4 shows aspects of a rotatable mount according to exemplary embodiments hereof.

In some embodiments, as shown in FIG. 4, the rotational mount 200 includes a body member 202 including a ball member 204 and a neck member 206. The neck member 206 may be generally cylindrical in shape extending outward from the ball member 204 which is generally spherical. The neck member 206 may include a longitudinal opening (preferably threaded) in its distal end adapted to receive a portion of the attachment housing's screw 120 passing through the end cap 118. In this way, the neck member 206 may be screwed onto the end of the screw 120 effectively attaching the rotational mount 200 to the distal end of the attachment housing's elongate member 102. The result of this is shown in FIG. 3.

Figure 5:
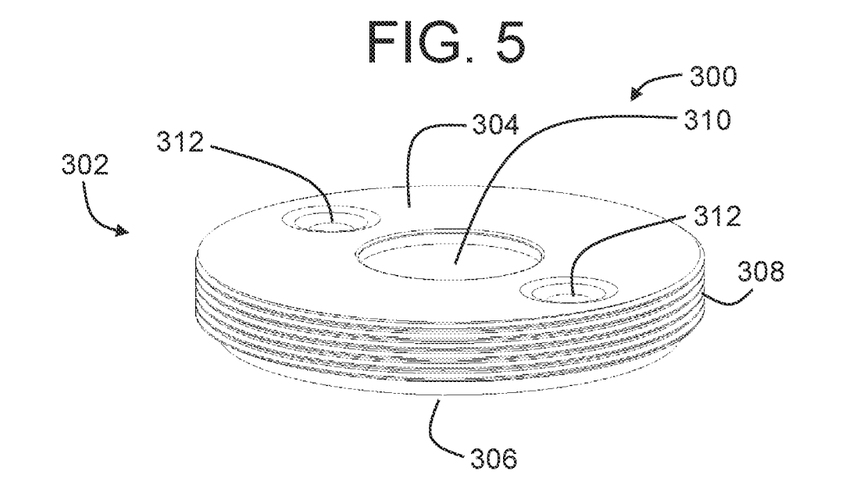
FIG. 5 shows aspects of a rotatable member according to exemplary embodiments hereof.

In some embodiments, as shown in FIG. 5, the rotational member 300 includes a member body 302 including a top side 304, a bottom side 306, and side walls 308 extending between the top side 304 and the bottom side 306. In some embodiments, the member body 302 is shaped as a cylindrical disc, however, it is understood that the member body 302 may be shaped as any suitable form.

In some embodiments, the sidewalls 308 are threaded so that the member body 302 may be threadedly coupled with the foot attachment 400 as will be described in other sections.

Figure 6:
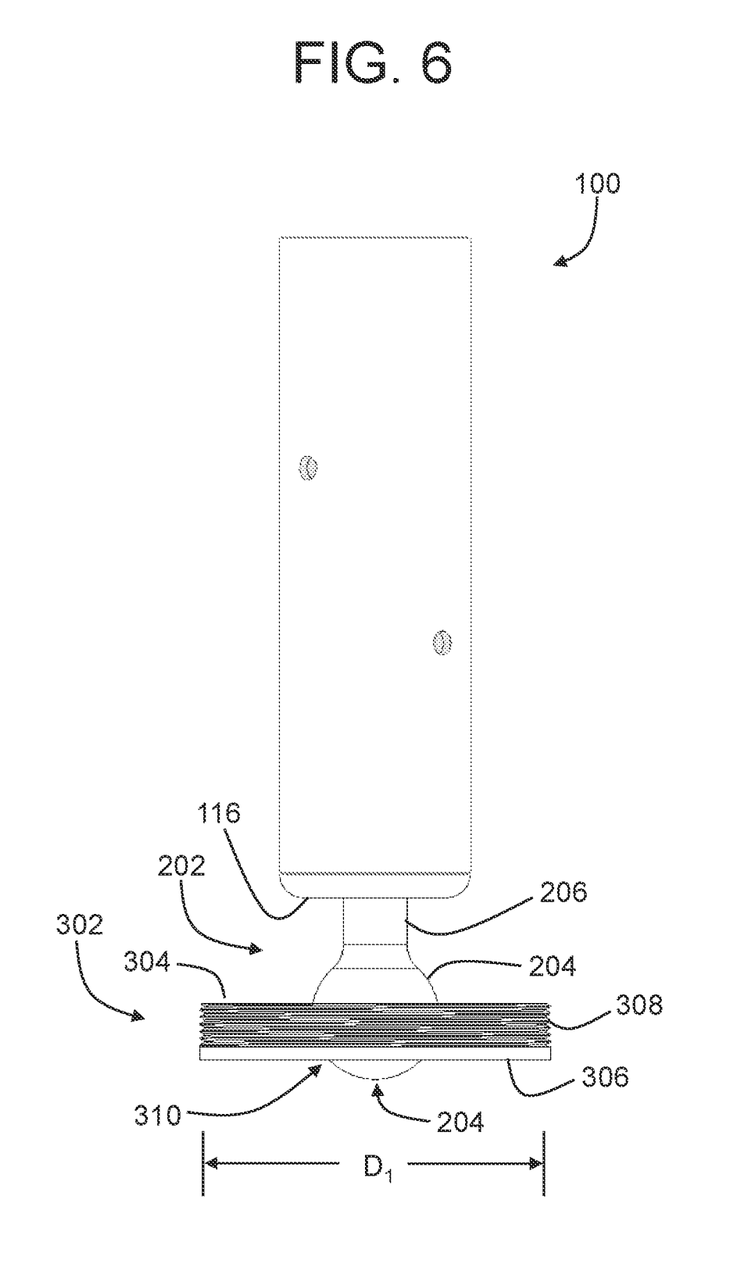
FIG. 6 shows aspects of a rotatable mount and a rotatable member according to exemplary embodiments hereof.

In some embodiments, the member body 302 includes an inner cavity 310 extending from the top side 304 to the bottom side 306 and preferably centered. In some embodiments, as shown in FIG. 6, the inner cavity 310 is shaped to receive at least a portion of the rotational mount's ball member 204. In this case, it may be preferable that the inner sidewalls of the inner cavity 310 be formed to generally match the size and shape of the ball member's outer side walls that are to be received into the cavity 310. For example, because the ball member 204 may be spherical, it may be preferable that the inner cavity 310 be formed as a spherical segment that corresponds to the spherical parameters of the ball member 204. In this way, the ball member 204 may be received into and rotatably secured within the cavity 310 while enabling the rotational member body 302 to rotate in three axis of freedom about the ball member 204. The result of this is shown in FIG. 6. FIG. 6 also shows the end cap 116 attached to the second end 106 of the attachment housing's elongate member 102 and the rotational mount 200 coupled to the end cap 116.

Notably, as shown, the height of the rotational body member 302 may be chosen such that a portion of the ball member 204 may extend outward from the body's bottom side 306. As will be describe in other sections, this portion of the ball member 204 may be accommodated by the foot attachment 400. In this way, the height of the rotational member body 302 may be minimized (i.e., not required to accommodate the bottom portion of the ball member 204) such that the overall height of the rotational member body 302 and the foot attachment 400 combination also may be minimized.

In some embodiments, as shown in FIG. 5, the rotational body member 302 includes one or more keyholes 312 (preferably threaded) in its top side 304 adapted to receive one or more thumbscrews (e.g., similar to thumbscrews 114 of FIG. 2). In some embodiments, the thumbscrews may be inserted into the keyholes 312 to provide a gripping structure that a user may grasp to assist in attaching the rotational body member 302 to the foot attachment 400. In other embodiments, the thumbscrews may be used to lock the rotational body member 302 to the foot attachment 400. This will be described in other sections.

Figure 7A:
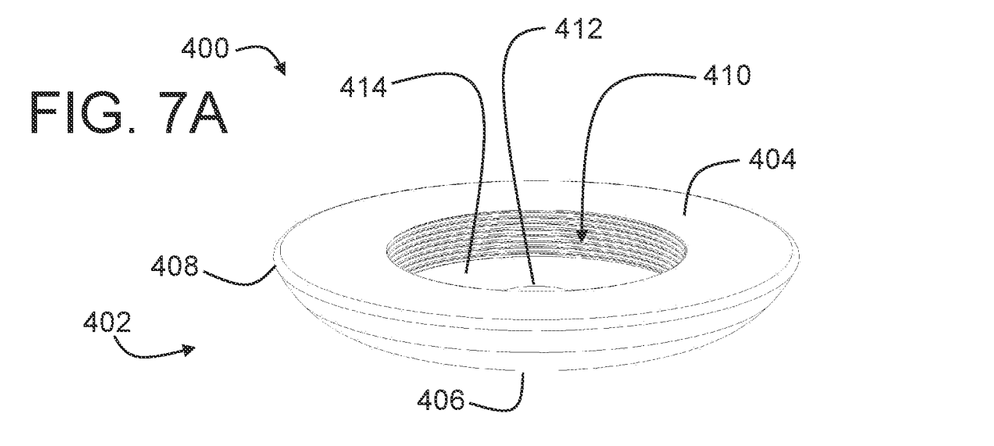
FIGS. 7A-7C show aspects of a foot attachment according to exemplary embodiments hereof.
Figure 7B:
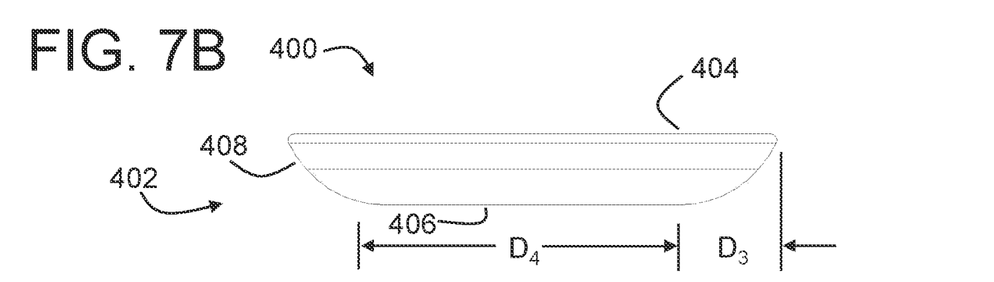
Figure 7C:
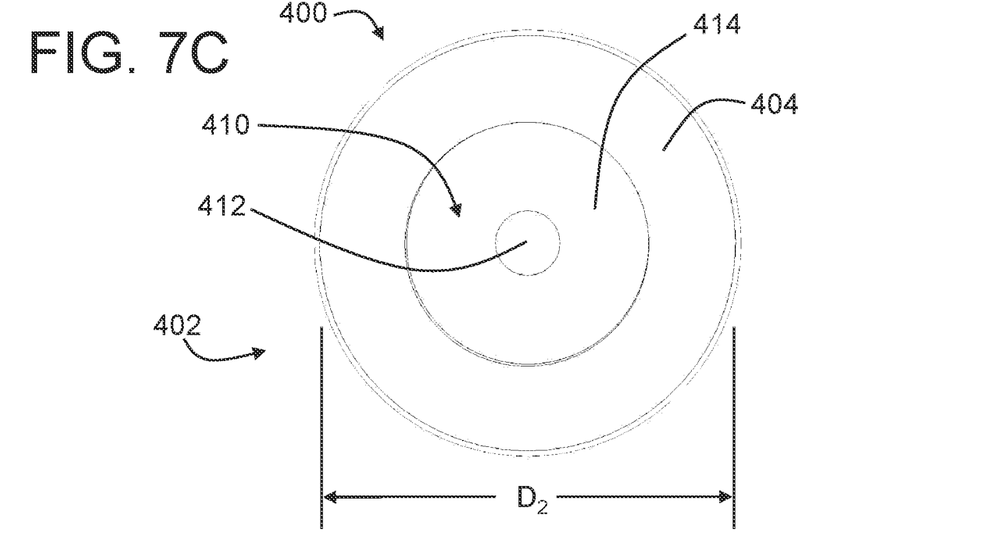

In some embodiments, as shown in FIGS. 7A, 7B, and 7C, the foot attachment 400 includes an attachment body 402 including a top side 404, a bottom side 406 and sidewalls 408 extending between the top side 404 and the bottom side 406. The attachment body 402 includes a topside cavity 410 extending from the top side 404 towards the bottom side 406. In some embodiments, the topside cavity 410 includes a cross-sectional shape that corresponds with the cross-sectional shape of the rotational member body 302 so that the rotational member body 302 may be at least partially received into the topside cavity 410 and releasably secured therein. In some embodiments, the sidewalls of the topside cavity 410 are threaded so that the rotational member body 302, also being threaded, may be screwed into the topside cavity 410 and held therein.

While the above description depicts the rotational member body 302 being held within the topside cavity 410 by corresponding threads, it is understood that the rotational body member 302 may be held within the topside cavity 410 by other attachment mechanisms, including but not limited to, detents, latches, screws, bolts, notches, other types of attachment mechanisms and any combinations thereof.

As shown in FIG. 6, a portion of the rotational mount's ball member 204 may extend out the bottom side 306 of the rotational member body 302 when the rotational mount 200 is coupled with the rotational member 300 as described above. Accordingly, in some embodiments, as shown in FIGS. 7A and 7C, the foot attachment's topside cavity 410 may include a recess 412 in the cavity's bottom surface 414. The recess 412 may preferably match (and/or at least accommodate) the shape of the portion of the ball member 204 that may extend outward from the bottom side 306 of the rotational body member 302 (as shown in FIG. 6). For example, the recess 412 may be generally shaped as a spherical segmented. In this way, the recess 412 may receive this portion of the ball member 204 when the rotational member body 302 is received into the rotational member body's topside recess 412 thereby providing adequate space for the ball member 204 to rotate.

In some embodiments, as shown in FIG. 6, the diameter D1 of the rotational body member 302 is about 1"-5", and preferably about 2"-4", and more preferably about 2.25"-3.5", and more preferably about 2.75". In addition, the height of the rotational body member 302 (between its top side 304 and its bottom side 306) is about 0.25"-1.0", and preferably about 0.3"-0.7", and more preferably about 0.432".

In some embodiments, the diameter of the ball member 204 is about 1.0" and the height of the rotational body member 302 is about 0.432" so that about 0.284" of the ball member 204 may extend outward from the bottom side 306 of the rotational body member 302 (as shown in FIG. 6) when the ball member 204 is received into the rotational body member's cavity 310. Accordingly, in some embodiments, the rotational member's recess 412 is preferable at least 0.284" so that the recess 412 may adequately receive this portion of the ball member 204 when the ball member 204 is received into the rotational body member's cavity 310 and the rotational body member 302 is received into the attachment body's topside cavity 410.

In some embodiments, as shown in FIG. 7B, the foot attachment's sidewalls 408 may include a generally convex curvature extending from the topside 404 to the bottom side 460. In some embodiments, the sidewalls 408 may taper inward over a distance $D_3$ such the diameter $D_2$ of the top side 404 may be greater than the diameter $D_4$ of the bottom side 406 and $D_2=D_3+D_4$. This may enable the foot attachment to smoothly glide over surfaces such as carpet, hardware flooring, tiled floors, etc.

In some embodiment, the diameter $D_2$ of the foot attachment body 402 top side 404 is about 2"-7", and preferably about 3"-6", and more preferably about 4"-5.5", and more preferably about 4.75", and the diameter $D_4$ of the foot attachment body 302 bottom side 406 is about 1"-5", and preferably about 1.5"-4", and more preferably about 2"-3.5", and more preferably about 2.88". In addition, the height of the attachment body 402 (between the top side 404 and the bottom side 406) is about 0.5"-2", and preferably about 0.5"-1", and more preferably about 0.685". It is understood that other dimensions also may be used depending on the implementation of the assembly 10.

Figure 8:
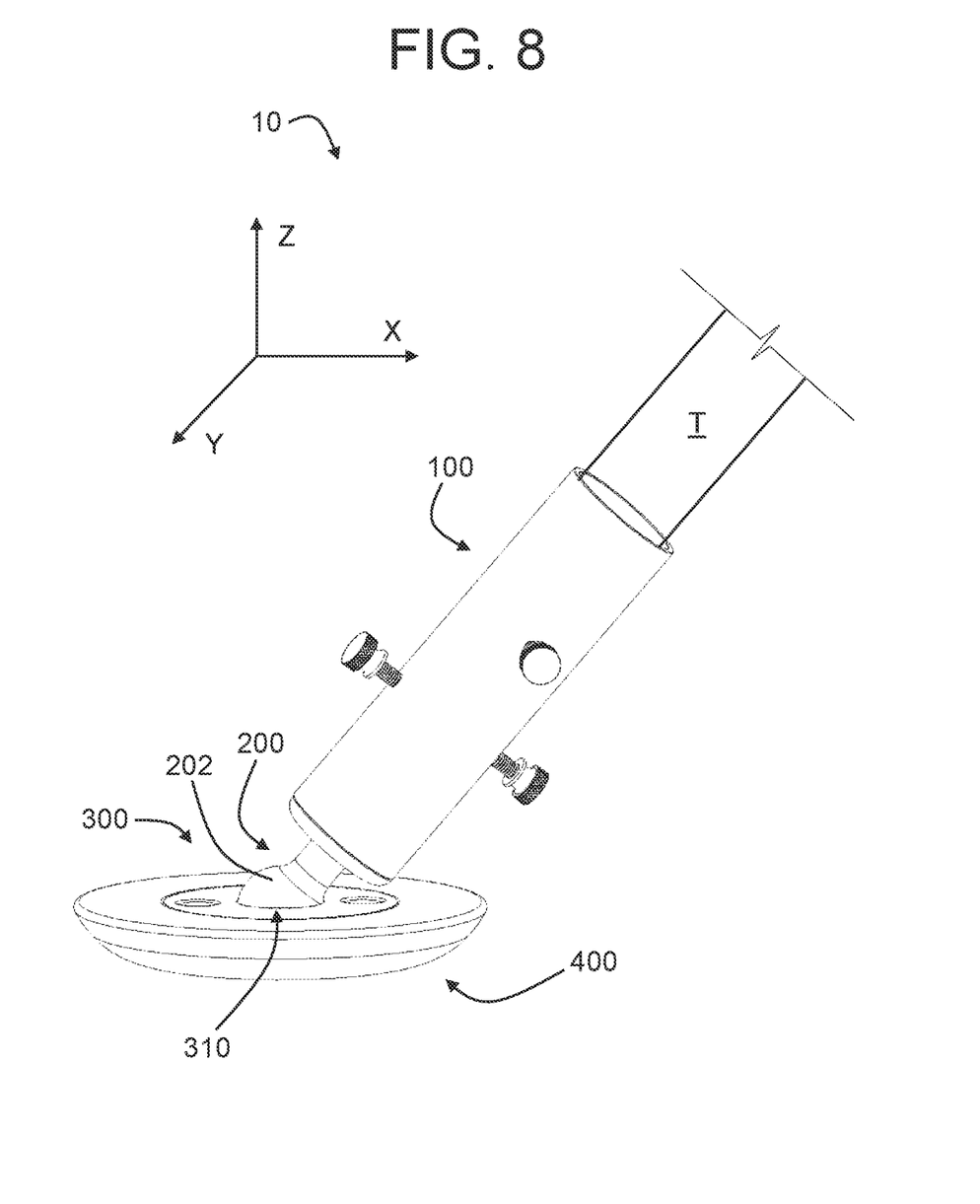
FIG. 8 shows aspects of an attachable foot assembly configured with a tripod leg according to exemplary embodiments hereof.

FIG. 8 shows a stand leg L configured with the attachable foot assembly 10 as described herein, with the attachment housing 100 at an offset angle with respect to the rotational member 300 and the foot attachment 400. As shown, the rotational mount's ball member 202 is rotatable within the rotational member's inner cavity 310 enabling the foot attachment 400 and the attachment housing 100 to rotate about three axis of freedom (e.g., the X, Y, and Z axis of FIG. 8) with respect to one another. This allows the attachment housing 100 to be placed at an orientation to receive and secure an end portion of a tripod leg L, and for the foot attachment 400 to pivot over uneven surfaces during use.

It also is understood that any aspect and/or element of any embodiment of the assembly 10 described herein or otherwise may be combined with any other aspect and/or element of any other embodiment described herein or otherwise in any way to form additional embodiments of the assembly 10 all of which are within the scope of the assembly 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. An attachable foot assembly comprising:
    an attachment housing including an elongate member with a first end, a second end, and sidewalls extending between the first end to the second end and defining an inner volume, the first end being open and in communication with the inner volume;
    a rotational mount coupled to the second end;
    a rotatable member rotatably coupled to the rotational mount;
    an attachable foot member including concave sidewalls and a smooth bottom surface and a top side including a first diameter and a bottom side including a second diameter, the first diameter greater than the second diameter, the attachable foot member releasably attached to the rotational mount.

2. The attachable foot assembly of claim 1 wherein the rotational mount includes a ball member and a neck member coupled to the ball member, and the rotatable member includes an inner cavity, and the ball member is rotatably coupled within the inner cavity.

3. The attachable foot assembly of claim 2 wherein the inner cavity extends from a top surface of the rotatable member to a bottom surface of the rotatable member.

4. The attachable foot assembly of claim 3 wherein at least a first portion of the ball member extends above the rotatable member's top surface and at least a second portion of the ball member extends below the rotatable member's bottom surface.

5. The attachable foot assembly of claim 1 wherein the attachable foot member includes a topside cavity adapted to receive and removably secure at least a portion of the rotatable member.

6. The attachable foot assembly of claim 5 wherein the rotatable member includes a first circular disc, and the topside cavity includes a circular cavity with dimensions that correspond to the dimensions of the first circular disc.

7. The attachable foot assembly of claim 6 wherein the first circular disc includes outer circumferential threads, and the circular cavity includes inner circumferential threads that correspond to the first circular disc's outer circumferential threads.

8. The attachable foot assembly of claim 6 wherein the rotational mount includes a ball member, and the circular cavity includes a bottom surface, and the bottom surface includes a ball member cavity adapted to accommodate at least a portion of the ball member.

9. The attachable foot assembly of claim 1 wherein the side walls include at least one opening to receive at least one attachment mechanism into the elongate member's inner volume.

10. The attachable foot assembly of claim 9 wherein the at least one attachment mechanism includes at least one thumb screw.

11. The attachable foot assembly of claim 1 further comprising an end cap coupled to cover the elongate member's second end.

12. The attachable foot assembly of claim 11 wherein the end cap includes a through hole and a screw passing through the through hole, the screw adapted to connect to the rotational mount.

13. The attachable foot assembly of claim 1 wherein the attachable foot member comprises a disc.

14. The attachable foot assembly of claim 1 wherein the attachable foot member's concave sidewalls taper inward from the top side to the bottom side.

15. An attachable foot assembly comprising:
    an attachment housing including an elongate member with a first end, a second end, and sidewalls extending between the first end to the second end and defining an inner volume, the first end being open and in communication with the inner volume;
    a rotational mount coupled to the second end;
    a rotatable member rotatably coupled to the rotational mount and including a first circular disc with first disc dimensions;
    an attachable foot member releasably attached to the rotational mount and including a topside cavity with cavity dimensions that correspond to the first disc dimensions and adapted to receive and removably secure at least a portion of the rotatable member;
    wherein the rotational mount includes a ball member, and the topside cavity includes a bottom surface, and the bottom surface includes a ball member cavity adapted to accommodate at least a portion of the ball member;
    wherein the attachable foot member includes concave sidewalls and a smooth bottom surface.

16. The attachable foot assembly of claim 15 wherein the attachable foot member includes a top side with a first diameter and a bottom side with a second diameter, and the first diameter is greater than the second diameter.

17. The attachable foot assembly of claim 15 further comprising an end cap coupled to cover the elongate member's second end wherein the end cap includes a through hole and a screw passing through the through hole, the screw adapted to connect to the rotational mount.

18. An attachable foot assembly comprising:
    an attachment housing including an elongate member with a first end, a second end, and sidewalls extending between the first end to the second end and defining an inner volume, the first end being open and in communication with the inner volume;
    a rotational mount coupled to the second end;
    a rotatable member rotatably coupled to the rotational mount;
    an attachable foot member releasably attached to the rotational mount; and
    an end cap coupled to cover the elongate member's second end and including a through hole and a screw passing through the through hole, the screw adapted to connect to the rotational mount;

wherein the attachable foot member includes concave sidewalls and a smooth bottom surface.

19. The attachable foot assembly of claim 18 wherein the attachable foot member includes a top side with a first diameter and a bottom side with a second diameter, and the first diameter is greater than the second diameter.

20. The attachable foot assembly of claim 18 wherein the attachable foot member includes a topside cavity adapted to receive and removably secure at least a portion of the rotatable member, the rotatable member includes a first circular disc with first disc dimensions, and the topside cavity includes a circular cavity with dimensions that correspond to the first disc dimensions;
   wherein the rotational mount includes a ball member, and the topside cavity includes a bottom surface, and the bottom surface includes a ball member cavity adapted to accommodate at least a portion of the ball member.

* * * * *